O. S. HOSMER.
DRILLING MECHANISM.

No. 189,895.  Patented April 24, 1877.

Witnesses.
W. E. Boardman
F. Hunnewell

Inventor.
O. S. Hosmer.
F. Curtis, Atty.

UNITED STATES PATENT OFFICE.

OREN S. HOSMER, OF BOSTON, MASSACHUSETTS.

IMPROVEMENT IN DRILLING MECHANISMS.

Specification forming part of Letters Patent No. 189,895, dated April 24, 1877; application filed February 26, 1877.

*To all whom it may concern:*

Be it known that I, OREN S. HOSMER, of Boston, Suffolk county, Massachusetts, have invented a new and useful Improvement in Drilling Mechanism, of which the following is a specification:

This invention has especial reference to round drills and their stocks or holders, and relates to means for confining such drills in such stocks or holders in such manner that they may be readily applied and removed, and prevented from turning in the socket which receives the shank; and the invention consists in the employment of a turn-button or latch, pivoted to the arbor, and provided with a rib or spur to enter a cross-notch in the shank of the drill, the whole being substantially as hereinafter shown.

Figure 1:
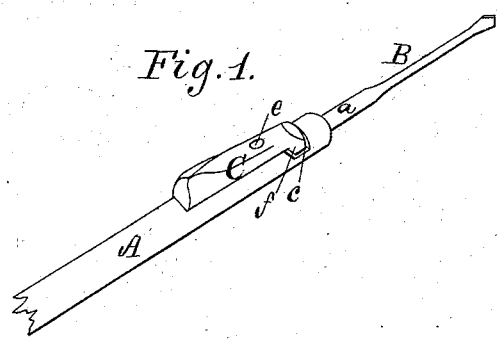
Figure 2:
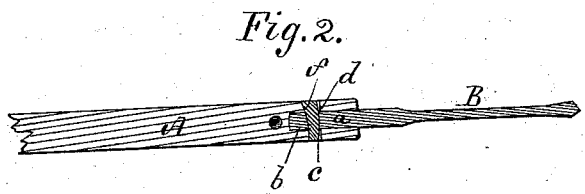
Figure 3:
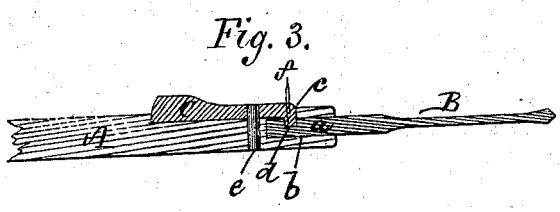

The drawings accompanying this specification represent in Figure 1 a perspective view, in Fig. 2 a longitudinal section, and in Fig. 3 a horizontal section, of a drill-arbor and drill embodying my improvement.

In these drawings, A represents the spindle or arbor of a hand-drill, while B represents the drill, the shank *a* of such drill extending into a socket, *b*, created axially in the end of the arbor in the ordinary method.

In carrying my improvement into practice, I cut across the arbor a channel, *c*, and coincident with this channel, but somewhat narrower, I cut in the shank of the drill a second channel, *d*.

I then provide a latch or turn-button, C, which I pivot near its outer end to the arbor, as shown at *e*, and I create upon the inner end of this button a ledge or spur, *f*, which enters and fills the notch in the shank of the drill.

Turning the latch C upon its pivot to one side removes its spur from the channel in the shank of the drill and permits the latter to be removed when desired. When the latch is turned so as to be parallel with the arbor the spur *f* enters the notch of the drill, and the latter is securely locked in position.

The working side or face of the spur *f* and the contiguous edge of the channel in the shank of the needle may be arranged obliquely to the axis of the arbor, in order to crowd together and produce a very tight joint as the latch is forced to its locked position.

It will be seen that the arrangement of the latch with the cylindrical drill and arbor is such that the spur *f* serves not only to retain the drill in place within the socket, but to prevent its turning in such socket.

I claim—

The combination, with a round drill and socketed holder or arbor, of a latch, pivoted at right angles to such holder or arbor, and provided with a lip to engage a notch or shoulder of the drill-shank, the adjacent surfaces of the lip and notch being flat and (when the drill is locked within its socket) close together, and the whole being so arranged that the latch serves not only to retain the drill in place within the socket, but to prevent turning of such drill in said socket, essentially as and for purposes stated.

O. S. HOSMER.

Witnesses:
 EDWIN STRAIN,
 W. E. BOARDMAN.